United States Patent [19]

Honda et al.

[11] Patent Number: 5,486,220
[45] Date of Patent: Jan. 23, 1996

[54] EXHAUST GAS PURIFICATION FILTER

[75] Inventors: Masaaki Honda; Tomohiko Ihara, both of Itami, Japan

[73] Assignee: Sumitomo Electric Industries, Ltd., Japan

[21] Appl. No.: 254,169

[22] Filed: Jun. 6, 1994

[30] Foreign Application Priority Data

Jun. 18, 1993 [JP] Japan ................................. 5-172366

[51] Int. Cl.$^6$ .................................................. B01D 39/20
[52] U.S. Cl. ........................ 55/487; 55/523; 55/DIG. 30; 55/DIG. 42
[58] Field of Search .................... 55/487, 523, DIG. 30, 55/DIG. 42

[56] References Cited

U.S. PATENT DOCUMENTS

| | | | |
|---|---|---|---|
| 3,920,428 | 11/1975 | Kinsley, Jr. | 55/DIG. 30 |
| 4,264,346 | 4/1981 | Man | 55/523 |
| 4,426,320 | 1/1984 | Ernest et al. | 55/DIG. 30 |
| 4,629,483 | 12/1986 | Stanton | 55/523 X |
| 4,704,863 | 11/1987 | Abthoff et al. | 55/523 X |
| 5,069,697 | 12/1991 | Hamaguchi et al. | 55/DIG. 30 |
| 5,195,319 | 3/1993 | Stobbe | 55/DIG. 30 |

FOREIGN PATENT DOCUMENTS

| | | |
|---|---|---|
| 211233 | 2/1987 | European Pat. Off. . |
| 322932 | 7/1989 | European Pat. Off. . |
| 129229 | 5/1994 | Japan . |
| WO92/17691 | 10/1992 | WIPO . |

OTHER PUBLICATIONS

Patent Abstracts Of Japan, vol. 16 No. 311 (M–1277); Jul. 8, 1992 JPA–4–86, 313; Mar. 18, 1992.
Patent Abstracts of Japan, vol. 17 No. 303 (C–1069); Jun. 10, 1993 JPA–5–23, 511; Feb. 2, 1993.

*Primary Examiner*—Robert Spitzer
*Attorney, Agent, or Firm*—Jordan B. Bierman; Bierman and Muserlian

[57] ABSTRACT

An exhaust gas purification filter comprising a metal porous body obtained by packing and fixing metal fibers having a mean fiber diameter of 5 to 40 μm or heat resistant ceramic fibers having a mean fiber diameter of 1 to 40 μm in a dispersed state into pores of a foamed structure porous body made of a heat-resistant metal so that a packing density of the resulting metal porous body is from 5 to 20%. The filter may be in a laminated structure by laminating the foregoing foamed structure porous body filled with or without the metal or ceramic fibers and a fiber structure porous body obtained by fixing metal fibers having a mean diameter of 5 to 40 μm or heat-resistant ceramic fibers having a mean diameter of 1 to 40 μm in a dispersed state so that a packing density is from 5 to 25% are laminated. By using the inventive filter for collecting PM (dry soot, fine particles and SOF) contained in an exhaust gas of a Diesel engine, a pressure loss for the exhaust gas is minimized while high collection efficiency is kept.

6 Claims, 3 Drawing Sheets

EXHAUST GAS PURIFICATION FILTER

BACKGROUND OF THE INVENTION

1. Field of the Invention

This invention relates to a filter for collecting [dry soot, fine particles and SOF (Soluble Organic Fraction), etc,] contained in an exhaust gas of a Diesel engine. Hereinafter, "particulate matter" is referred to as "PM" for abbreviation.

2. Description of the Prior Art

Exhaust gases of automobiles are one of the major causes for air pollution, and technology for removing noxious components contained in the exhaust gases is extremely important. Particularly, in Diesel engine vehicles, removal of PM containing carbon fine particles as a principal component is very important. To remove these noxious components, engine improving attempts have been made by applying EGR (Exhaust Gas Recirculation) and improving a fuel injection system and the shape of a combustion chamber. Nonetheless, a drastic measure has not yet been established. Therefore, a method which disposes an exhaust trap in an exhaust passage, collects PM by the trap and removes them by after-treatment has been proposed (Japanese Patent Laid-Open No. 51235/11983). This after-treatment method has been believed most practical to this date, and further studies have been continued.

The particulate trap for collecting the PM must satisfy the following performance as required by the conditions of use of the trap.

First, the particulate trap must have PM collection efficiency to satisfy a required purity of the exhaust gas. The PM emission quantity varies with an exhaust quantity and a load of the Diesel engine, but it is believed that the trap must collect at least 60% of the mean PM emission quantity (at least 85% of dry soot collection efficiency) from the Diesel engine.

Second, a pressure loss to the exhaust gas must be small. As more PM is collected, the pressure loss at the time when the engine exhaust gas passes through the trap becomes greater, so that a back pressure acts on the engine and exerts adverse influences on the engine. It is generally believed that the pressure loss after collection must be limited to not higher than 3 kPa. To satisfy this requirement, the filter element must be periodically cleaned to remove the PM whenever a predetermined quantity of the PM is collected, so as to regenerate the filter element and to return it to the initial pressure loss state. When the ratio of the rise of the pressure loss to the PM collection quantity is great, this regeneration/removal operation becomes more frequent and is not practical. Accordingly, the particulate trap must not only have a small initial pressure loss but must also prevent easy rise of the pressure loss even after the PM in the exhaust gas is collected.

Third, the trap must have durability sufficient to withstand the regeneration/removal operation described above which is repeatedly carried out. A burning-removal method which burns and removes the PM by electric heating or burner heating is believed the most effective regeneration method, but in either of the systems, heating is made to a temperature (about 600° C.) or above at which the PM is ignited. Regeneration is executed before the drop of engine performance or a trouble of the operation due to the back pressure occurs, and the PM is burnt and disposed. Thereafter, the PM is again collected, and regeneration of the trap and collection are again carried out, so that the pressure loss can be always kept below a predetermined level. For this reason, heat-resistant materials capable of withstanding repeated regeneration processing must be selected as the filter element materials, and corrosion resistance to the atmospheric gas contained in the exhaust gas is also necessary.

Conventionally, a wall flow system honeycomb-like porous body of cordierite ceramics has been believed to be most practical candidate for the filter element material that satisfies the requirements described above. According to this system, however, the PM is likely to locally gather. Further, because the cordierite ceramics have a low thermal conductivity, heat spots are likely to be formed at the time of regeneration, and the filter is molten and lost or cracks occur due to a thermal stress. For these reasons, reliability cannot be secured.

To solve the problems described above, a honey-comb-like porous body using SiC ceramics is used for the filter element. This filter element can prevent melt-loss and cracks at the time of regeneration due to a high thermal conductivity of SiC, but has not yet been put into practical application because a greater calorie is necessary at the time of regeneration (Japanese Patent Laid-Open No. 23512/1993).

Diesel particulate filters and their system which can be regenerated without the occurrence of melt-loss and cracks by using a foamed metal have been investigated. However, the foamed metal has a mean skeletal thickness of at least 80 μmφ and a mean pore diameter of at least 200 μmφ. Therefore, even when the foamed metal is rolled to change the pore shape, a dry soot collection efficiency of at least 75% cannot be attained (Japanese Patent Laid-Open No. 86313/1992), and another problem remains unsolved in that collection efficiency greatly fluctuate depending on the engine condition.

BACKGROUND OF THE INVENTION

The present invention is completed so as to solve the problems described above, and is characterized in that a foamed metal (three-dimensional net-like structure porous body) and a heat-resistant fiber are combined with each other.

According to the present invention, there is provided an exhaust gas purification filter comprising a metal porous body obtained by packing and fixing metal fibers having a mean fiber diameter of 5 to 40 μm or heat resistant ceramic fibers having a mean fiber diameter of 1 to 40 μm in a dispersed state into pores of a foamed structure porous body made of a heat-resistant metal so that a packing density of the resulting metal porous body is from 5 to 20%.

In another embodiment of the present invention, the foregoing metal porous body obtained by packing the metal or ceramic fibers into the foamed structure porous body and a fiber structure porous body obtained by fixing metal fibers having a mean diameter of 5 to 40 μm or heat-resistant ceramic fibers having a mean diameter of 1 to 40 μm in a dispersed state so that a packing density is from 5 to 25% are laminated. In this laminated structure, the foamed structure porous body may be used without being filled with the metal or ceramic fibers.

Packing densities indicated in the specification are volume percentages, $100 \times V_B/V_T$ (%), of the volumes ($V_B$) substantially occupied by the constituent materials (i.e., heat-resistant metal constituting the skeletal structure of the foamed structure porous body and the metal or ceramic fibers to be filled into the formed structure porous body or constituting the skeletal structure of the fiber structure porous body) with respect to the entire volume ($V_T$) of the metal porous body, foamed structure porous body or the fiber structure porous body including pores present therein, unless otherwise specified. When the constituent materials ) are per se hollow, the volume of the hollow parts inside them are included in the $V_B$ and the hollow parts exert no influence on the collection efficiency of the filter, although they are advantageous in providing lightweight filters.

DETAILED DESCRIPTION OF THE PREFERRED EMBODIMENTS

Figure 1:
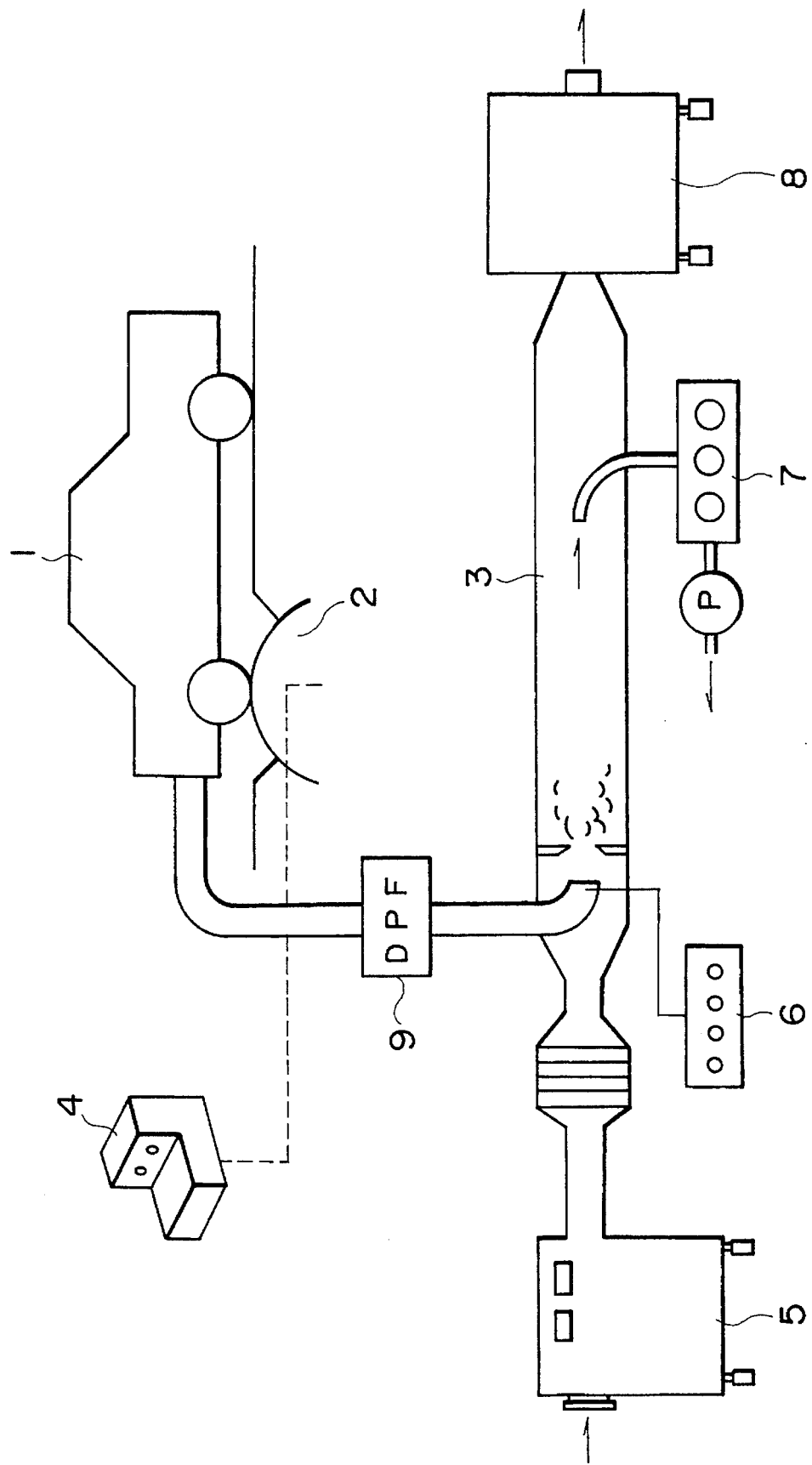
FIG. 1 is an explanatory view of an experimental apparatus in an embodiment of the present invention.

In the above-mentioned exhaust gas purification filter of the present invention, the fiber structure porous body is constituted of metal fibers or ceramic fibers and the packing density is 5 to 25%,. If the packing density is less than 5% in the fiber structure porous body, a skeletal structure is deformed and broken by an inflow pressure of the exhaust gas, and dry soot collection efficiency drops. If the packing density exceeds 25%, on the other hand, the pressure loss becomes so great that even when the thickness is reduced, the filter cannot be molded. For good dispersion state of the metal or ceramic fibers, the fiber mean diameter is 5 to 40 μm for the metal fibers and 1 to 40 μm for the ceramic fibers.

The foregoing fiber structure porous body is used in combination with the foamed structure porous body made of a heat resistant metal in a laminated structure, in which the foamed structure porous body may be filled with metal or ceramic fibers, although it may be used without, these fillers. When the heat-resistant fibers are packed in pores of the foamed structure porous body and fixed therein, aggregation occurs if the fiber diameter is less than 5 μm in the case of the metal fibers and less than 1 μm in the case of the ceramic fibers, and the fibers cannot be packed in the dispersed state. On the other hand, when the fiber diameter exceeds 40 μm, the fibers cannot be uniformly packed into the pores of the foamed metal. Further, as to the packing density of the foamed structure porous body after being filled with the metal or ceramic fibers, the upper limit and the lower limit are 20% and 5%, respectively, because of the same phenomenon as that of the fiber structure porous body.

A packing density of the foamed structure porous body is preferably from 30 to 40%. This packing density can be changed by rolling the foamed structure porous body so as to cause deformation of the pore shapes, but the range described above is set from the aspects of the balance between collection efficiency and the rise of a pressure loss. In other words, if the packing density is less than 30%, the collection efficiency becomes too low, and if it exceeds 40%, the rise of the pressure loss becomes excessively great.

The filter of the present invention may be made of the aforesaid foamed structure porous body filled with the metal or ceramic fibers, without combining the fiber structure porous body.

To obtain a collection efficiency satisfying the emission regulation values in the U.S.A. and Japan, the mean pore diameter is set to be from 100 to 500 μm. If it is less than 100 μm, collection efficiency is high but gas permeability resistance becomes great. When it exceeds 500 μm, on the contrary, collection efficiency becomes insufficient.

In some of production methods for the fiber structure porous body, metal is plated with carbon fibers or resin fibers used as a core material. When the core material has a low heat-resistant temperature such as the resin fiber, the core material is removed by evaporation or combustion by carrying out heat-treatment after plating, but when the core material has a high melting point such as carbon, it can be left as such. Accordingly, a hollow fiber structure porous body can be obtained in the former case, and a fiber structure porous body having a different kind material as the core, in the latter case. In the filter of the present invention, not only a solid fiber structure porous body wholly constituted by the metal but also either of the fiber structure porous bodies described above may be used.

If the trap is constituted solely by a metal fiber non-woven fabric (fiber structure porous body) having a small pore diameter, for example, the filter surface is gradually clogged with the progress of PM collection. In contrast, according to the combination structure wherein a foamed metal having a larger pore diameter is disposed on the inflow side and a metal fiber non-woven fabric with a smaller pore diameter is disposed on the outflow side, PM having a larger particle diameter is mainly collected by a filter front layer (inflow side) and PM having a smaller particle diameter is collected by a filter rear layer (outflow side). Accordingly, clogging hardly occurs on both the surface and the inside of the filter.

When clogging occurs in the filter, the pressure loss starts drastically increasing. It is therefore believed from the particulate deposition condition described above that the combined structure of the foamed metal and the metal fiber non-woven fabric provides a lower pressure loss when the same quantity of PM is collected. According to this structure, a high dry soot collection efficiency can be secured by the function of the filter rear layer.

A structure, wherein the pores of a foamed structure porous body made of a heat-resistant metal are filled with metal or ceramic fibers and the fibers are fixed inside the pores of the foamed structure porous body, also provides both a high PM collection efficiency and a low pressure loss due to their interaction.

Hereinafter, an example of the present invention will be explained.

Example 1

FIG. 1 shows an experimental apparatus. Evaluation results of a pressure loss and a dry soot collection efficiency obtained using the experimental apparatus comprising a chassis dynamometer 2 and a dilution tunnel 3 of a 3,400 cc, 4-cylinder direct injection type Diesel engine car 1 are illustrated. In FIG. 1 reference numeral 4 denotes a controller, 5 is a diluted air temperature controller, 6 is an exhaust gas thermometer, 7 is a filter collection device, 8 is a blower and 9 is a diesel particulate filter (PDF).

Seven cylinders, made using an Ni-based three-dimensional net-like structure porous body manufactured by Sumitomo Electric Industries Ltd. under a trade name "CELMET", were fitted as a filter element into a trap container. An exhaust gas was introduced into the space outside the cylinders, and an end face opposite to the gas inflow side was sealed by a gasket and an iron sheet so that the gas flew into the cylinders through their walls.

Table 1 shows evaluation samples. A sample A is a comparative sample constituted by the foamed metal (CELMET) alone, and samples B and D comprised the combination of the foamed metal and a metal non-woven fabric (metal fiber structure porous body), similar to felt, with the foamed metal being disposed on the exhaust gas inflow side. Samples C and E were formed by packing and fixing metal fibers in a dispersed state into the pores of the foamed metal. The mean pore diameter of the foamed metal used was 400 μm. Incidentally, symbol # in Table 1 represents the number of cells (number of pores) per unit area, and #7 represents 50 to 70 cells per square inch.

Example 2

Evaluation results obtained by the same experimental apparatus as that of Example 1 are illustrated. Seven cylinders obtained by combining an Ni—Cr alloy three-dimensional net-like structure porous body ("CELMET", a trade name) manufactured by Sumitomo Electric Industries, Ltd. and an Ni—Cr alloy non-woven fabric (metal fiber structure porous body) were fitted as the filter element into a trap container. An exhaust gas was introduced into the space outside the cylinders, and an end face opposite to the gas inflow side was sealed by a gasket and an iron sheet so that the gas flew into the cylinders through their walls.

Table 2 shows evaluation samples. A sample F is a comparative sample constituted by the foamed metal (CEL-

TABLE 1

| Sample | Constituent Material | Material dimensions | No. of turns | Material | Size (mm) | No. of cylinders |
|---|---|---|---|---|---|---|
| A | CELMET #7 | 0.9 mmt, packing density: 30% | 5 | Ni | 48 φ × 39 φ 190 L | 7 |
| B | CELMET #7 | 0.9 mmt, packing density: 30% | 1 | Ni | | |
| | Metal fiber structure porous body | 0.5 mmt, packing density: 10% fiber diameter: 20 μm | 1 | Sus | 48 φ × 45 φ 190 L | 7 |
| C | CELMET #7 | 1.8 mmt, packing density: 10% | | Ni | | |
| | Metal fiber | fiber diameter: 18 μm (fibers were sintered to CELMET to packing density of 20%) | 1 | Ni | 48 φ × 46 φ 190 L | 7 |
| D | CELMET #7 | 0.9 mmt, packing density: 30% | 1 | Ni | | |
| | Metal fiber structure porous body | 0.5 mmt, packing density: 25% fiber diameter: 40 μm | 1 | Sus | 48 φ × 45 φ 190 L | 7 |
| E | CELMET #7 | 1.8 mmt, packing density: 10% | | Ni | | |
| | Metal fiber | fiber diameter: 18 μm (fibers were sintered to CELMET to packing density of 20%) | 1 | Ni | 48 φ × 46 φ 190 L | 7 |

Figure 2:
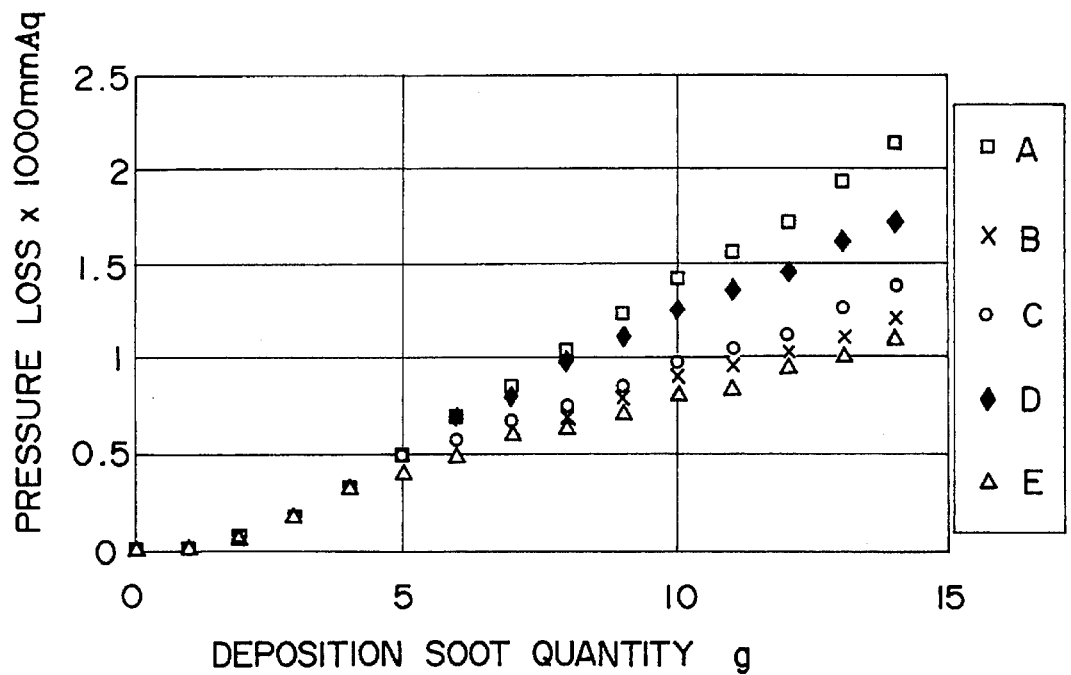
FIG. 2 is a graph showing the relation between a deposition soot quantity and a pressure loss.
Figure 3:
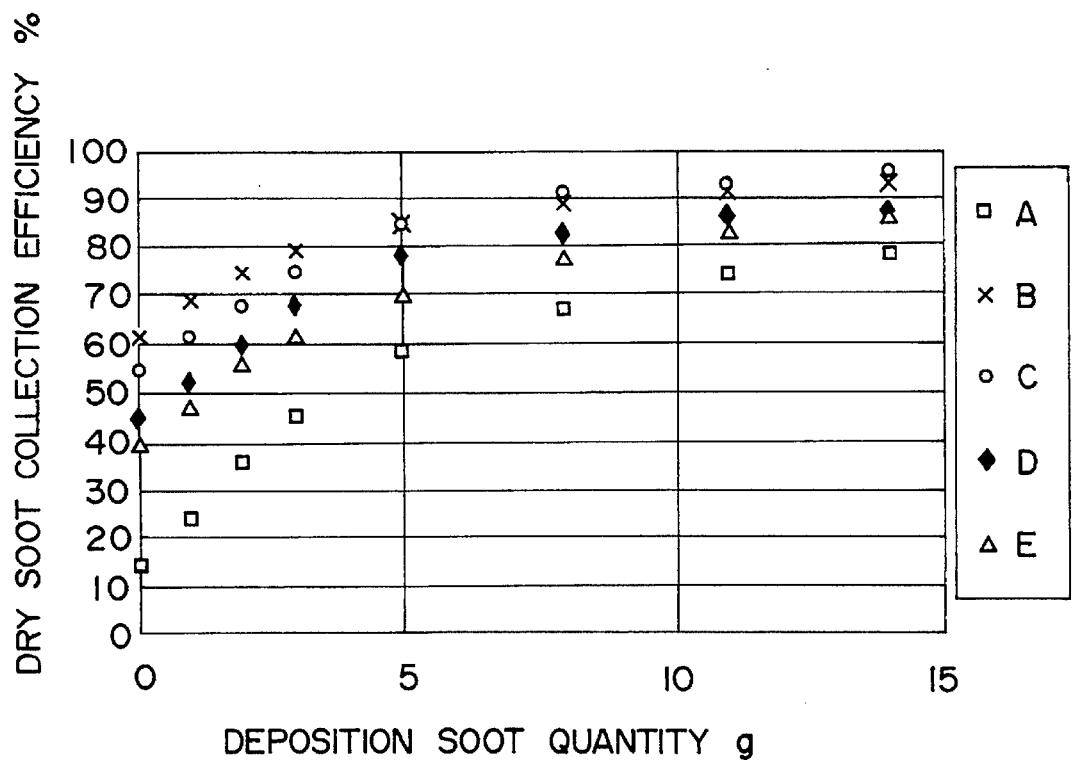
FIG. 3 is a graph showing the relation between the deposition soot quantity and a dry soot collection efficiency.

FIGS. 2 and 3 show the changes of a pressure loss and collection efficiency with respect to a deposition PM (Particulate Matter) quantity. It can be understood that in comparison with the sample A, the samples B to E restricted the rise of the pressure loss to minimum while improving the dry soot collection efficiency.

MET) alone, and a sample G comprised the combination of the foamed metal and the alloy nonwoven fabric. The mean pore diameter of the foamed metal used was 400 μm. Symbol #7 has the same meaning as in Example 1.

TABLE 2

| Sample | Constituent material | Material dimensions | No. of turns | Material | Size (mm) | No. of cylinders |
|---|---|---|---|---|---|---|
| F | CELMET #7 | 0.9 mmt, packing density: 35% | 5 | Ni—Cr | 48 φ × 39 φ 190 L | 7 |
| G | CELMET #7 | 0.9 mmt, packing density: 35% | 1 | Ni—Cr | | |
| | Metal fiber | 0.5 mmt, | 1 | Ni—Cr | 48 φ × 45 φ 190 L | 7 |

TABLE 2-continued

| Sample | Constituent material | Material dimensions | No. of turns | Material | Size (mm) | No. of cylinders |
|--------|---------------------|---------------------|--------------|----------|-----------|------------------|
|        | structure porous body | packing density: 12% fiber diameter: 22 μm | | | | |

Figure 4:
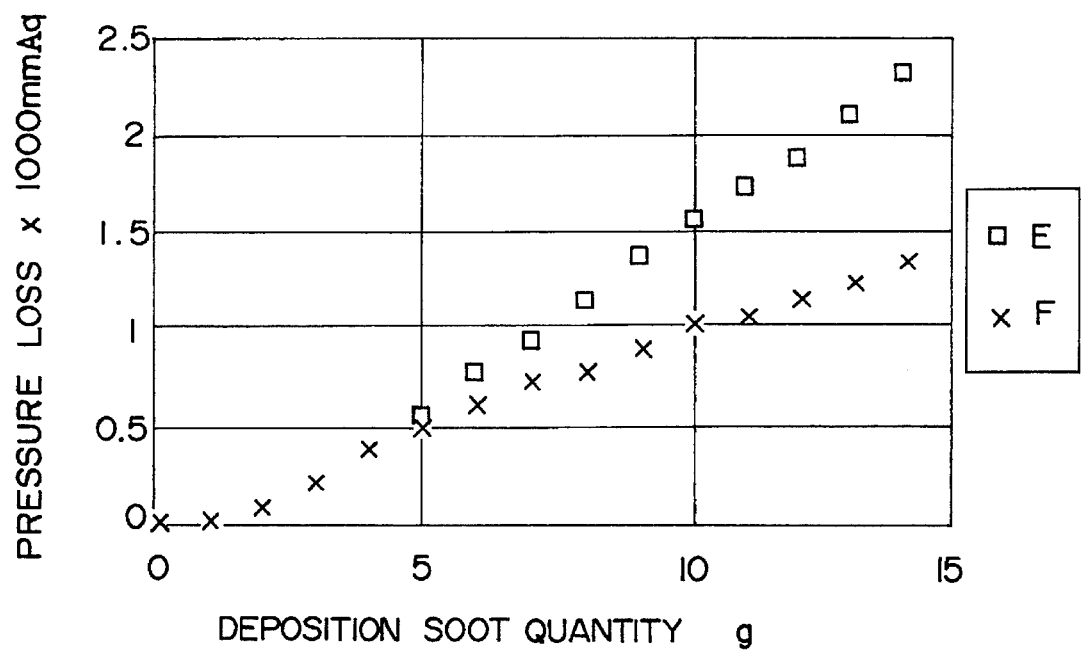
FIG. 4 is a graph showing the relation between the deposition soot quantity and a pressure loss.
Figure 5:
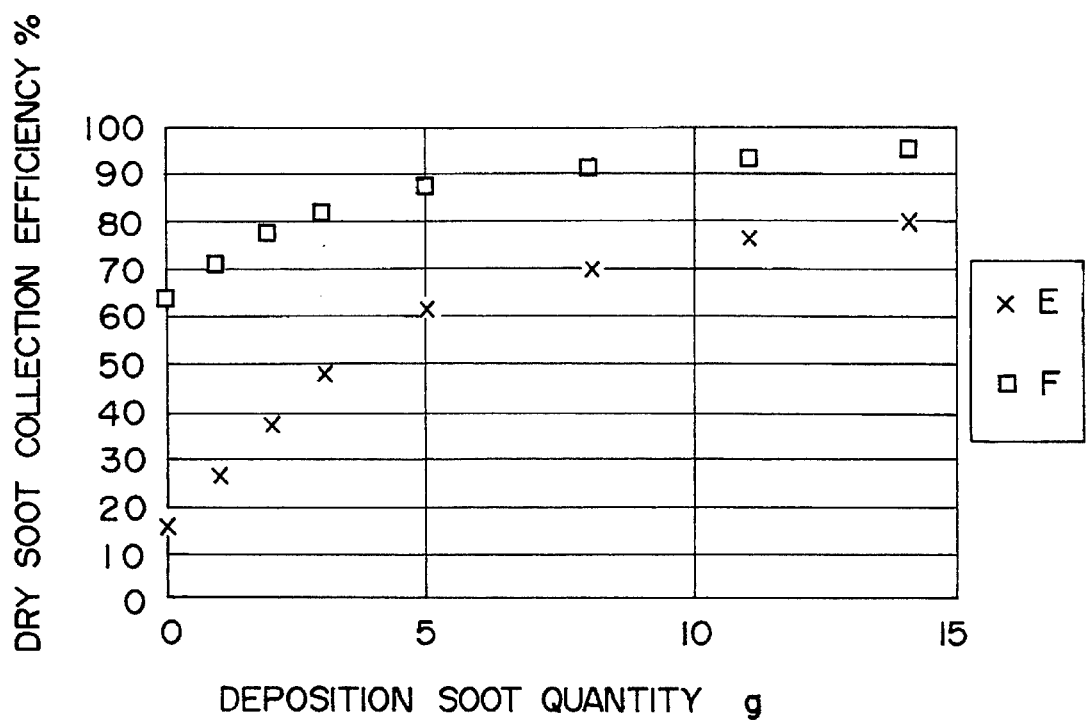
FIG. 5 is a graph showing the relation between the deposition soot quantity and the dry soot collection efficiency.
Figure 4:
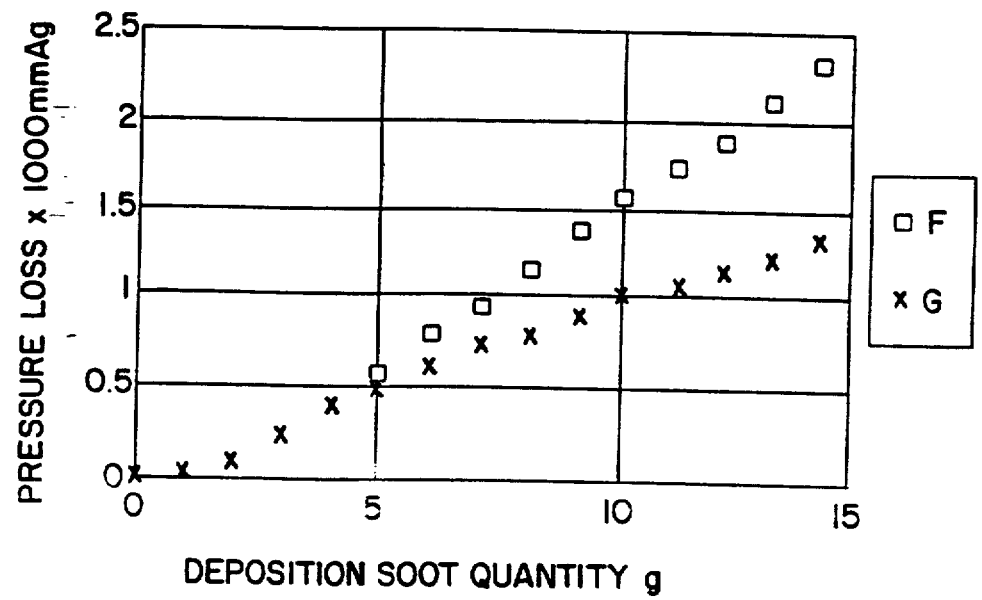
Figure 5:
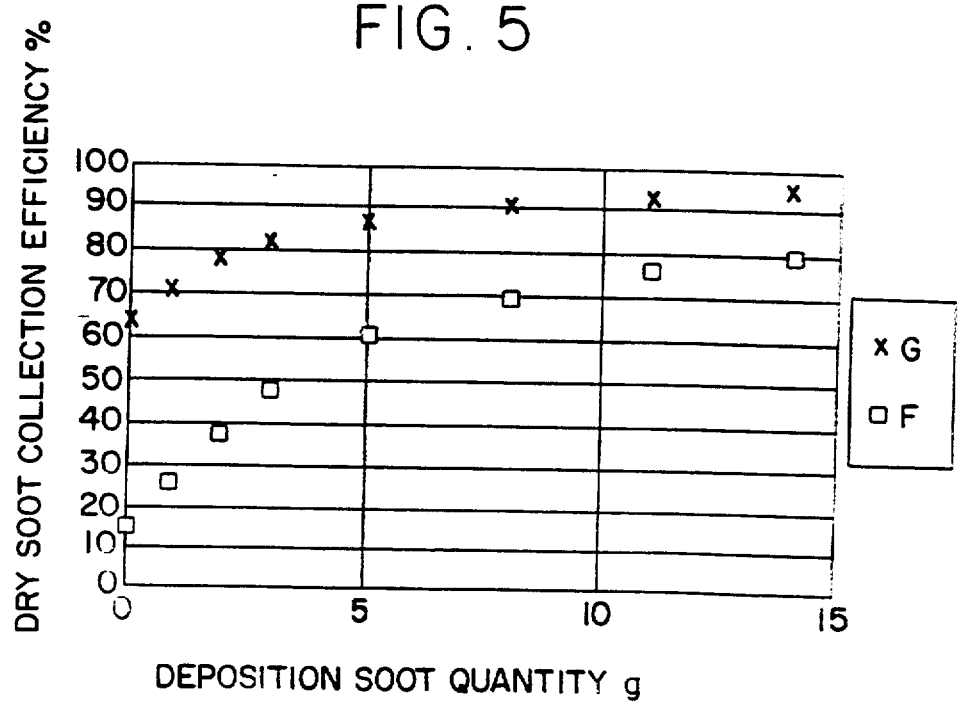

FIGS. 4 and 5 show the changes of a pressure loss and collection efficiency with respect to a deposition PM (Particulate Matter) quantity. It can be understood that in comparison with the sample F, the sample G restricted the rise of the pressure loss to minimum while improving the dry soot collection efficiency.

Though this example used Ni—Cr as an alloy having a high corrosion resistance, life at 800° C. could be improved more than 10 times with the same dry soot collection efficiency and the same pressure loss by the use of Ni—Cr—Al.

As described above, according to the structure of the present invention, there can be provided a filter wherein the pressure loss does not easily rise even when the PM is collected, and the filter can withstand thermal impact of heating and cooling at the time of regeneration. Therefore, the filter of the present invention can be used effectively for a particulate trap for collecting and removing the PM in a Diesel engine exhaust gas.

What is claimed is:

1. An exhaust gas purification filter comprising a porous body obtained by packing and fixing fibers formed of a metal, excluding metal oxides and ceramics, and having a mean fiber diameter of 5 to 40 μm in a dispersed state, into pores of a foamed structure porous body made of a heat-resistant metal, excluding metal oxides and ceramics, whereby a packing density of said porous body is 5 to 20%.

2. An exhaust gas purification filter according to claim 1, wherein the mean pore diameter of said foamed structure porous body is from 100 to 500 μm.

3. An exhaust gas purification filter comprising a foamed structure porous body made of a heat-resistant metal, excluding metal oxides and ceramics, and a fiber structure porous body obtained by fixing fibers formed of a metal, excluding metal oxides and ceramics, and having a mean fiber diameter of 5 to 40 μm, in a dispersed state, whereby a packing density is from 5 to 25%, are laminated.

4. An exhaust gas purification filter according to claim 3, wherein the mean pore diameter of said foamed structure porous body is from 100 to 500 μm.

5. An exhaust gas purification filter comprising a porous body obtained by packing and fixing fibers formed of a metal, excluding metal oxides and ceramics, and having a mean fiber diameter of 5 to 40 μm in a dispersed state, into pores of a foamed structure porous body made of a heat-resistant metal, excluding metal oxides and ceramics, whereby a packing density of said porous body is 5 to 20%., and a fiber structure porous body obtained by fixing fibers formed of metal, excluding metal oxides and ceramics, and having a mean fiber diameter of 5 to 40 μm in a dispersed state, so that a packing density is from 5 to 25%, are laminated.

6. An exhaust gas purification filter according to claim 5, wherein the mean pore diameter of said foamed structure porous body is from 100 to 500 μm.

* * * * *

UNITED STATES PATENT AND TRADEMARK OFFICE
CERTIFICATE OF CORRECTION

PATENT NO. : 5,486,220

DATED : January 23, 1996

INVENTOR(S) : HONDA, et al

It is certified that error appears in the above-identified patent and that said Letters Patent is hereby corrected as shown below:

Cancel Figs. 4 and 5, insert attached Figs. 4 and 5.

Signed and Sealed this

Twenty-first Day of May, 1996

Attest:

BRUCE LEHMAN

Attesting Officer

Commissioner of Patents and Trademarks